US009807032B2

(12) United States Patent  
Merola

(10) Patent No.: US 9,807,032 B2
(45) Date of Patent: Oct. 31, 2017

(54) UPGRADABLE, HIGH DATA TRANSFER SPEED, MULTICHANNEL TRANSMISSION SYSTEM

(71) Applicant: Robert W Merola, Lunenburg, MA (US)

(72) Inventor: Robert W Merola, Lunenburg, MA (US)

(73) Assignee: WYTEC INTERNATIONAL, INC., San Antonio, TX (US)

( * ) Notice: Subject to any disclaimer, the term of this patent is extended or adjusted under 35 U.S.C. 154(b) by 234 days.

(21) Appl. No.: 14/223,708

(22) Filed: Mar. 24, 2014

(65) Prior Publication Data

US 2015/0264742 A1 Sep. 17, 2015

Related U.S. Application Data

(60) Provisional application No. 61/952,013, filed on Mar. 12, 2014.

(51) Int. Cl.
*H04W 88/02* (2009.01)
*H04L 12/933* (2013.01)
*H04B 1/03* (2006.01)
*H04B 1/036* (2006.01)

(52) U.S. Cl.
CPC .............. *H04L 49/10* (2013.01); *H04B 1/03* (2013.01); *H04B 1/036* (2013.01); *H04W 88/02* (2013.01)

(58) Field of Classification Search
None
See application file for complete search history.

(56) References Cited

U.S. PATENT DOCUMENTS

| 5,875,396 | A | 2/1999 | Stockton et al. | |
|---|---|---|---|---|
| 5,896,382 | A * | 4/1999 | Davis | H04L 12/2801 370/347 |
| 5,914,620 | A | 6/1999 | Simons et al. | |
| 5,923,229 | A | 7/1999 | Simons | |
| 6,041,219 | A | 3/2000 | Peterson | |
| 6,243,427 | B1 | 6/2001 | Stockton et al. | |
| 6,263,374 | B1 * | 7/2001 | Olnowich | G06F 13/4022 709/250 |
| 7,123,605 | B1 * | 10/2006 | Nadeem | H04L 47/10 370/341 |
| 7,190,973 | B1 * | 3/2007 | Erwin | H04W 24/02 455/423 |
| 7,310,664 | B1 * | 12/2007 | Merchant | H04L 41/0886 709/220 |
| 7,642,988 | B1 | 1/2010 | Johnson et al. | |
| 8,385,305 | B1 * | 2/2013 | Negus | H04W 76/025 370/310 |
| 2007/0128942 | A1 * | 6/2007 | Li | G06K 7/0021 439/630 |

(Continued)

FOREIGN PATENT DOCUMENTS

WO 2013120653 A1 8/2013

*Primary Examiner* — Jeffrey M Rutkowski
*Assistant Examiner* — Jonathan B Wood
(74) *Attorney, Agent, or Firm* — Dentons US LLP

(57) ABSTRACT

A local area network system that includes modular, multi-frequency, multi-channel, upgradable transmission nodes. The transmission nodes may include one or more independent RF modules and may be configured to include, for example, 802.11ac and may evolve to LTE and other technologies and frequency bands.

25 Claims, 10 Drawing Sheets

(56) References Cited

U.S. PATENT DOCUMENTS

| | | | |
|---|---|---|---|
| 2007/0155325 A1 | 7/2007 | Bambic et al. | |
| 2007/0296831 A1* | 12/2007 | Nozaki | H04N 5/907 348/231.8 |
| 2008/0218980 A1* | 9/2008 | Tracewell | H05K 7/20672 361/713 |
| 2009/0232505 A1* | 9/2009 | Degan | G02B 6/4453 398/101 |
| 2010/0299544 A1* | 11/2010 | Hansalia | H04L 12/66 713/320 |
| 2011/0099280 A1* | 4/2011 | Thomas | H04L 63/0281 709/228 |
| 2012/0023343 A1* | 1/2012 | Gupta | G06F 1/26 713/310 |
| 2013/0039355 A1 | 2/2013 | de la Garrigue | |
| 2013/0091579 A1* | 4/2013 | White | H04L 63/1416 726/25 |
| 2014/0235287 A1* | 8/2014 | Maltsev | H04W 52/267 455/522 |
| 2014/0258763 A1* | 9/2014 | Senzaki | G06F 1/30 713/340 |
| 2015/0057047 A1 | 2/2015 | Hendrix et al. | |
| 2015/0138977 A1* | 5/2015 | Dacosta | H04W 28/021 370/235 |

\* cited by examiner (a)

(b)

(c)

UPGRADABLE, HIGH DATA TRANSFER SPEED, MULTICHANNEL TRANSMISSION SYSTEM

This application claims the benefit of U.S. Provisional Patent Application No. 61/952,013, filed on Mar. 12, 2014, which is hereby incorporated by reference for all purposes as if fully set forth herein.

BACKGROUND OF THE INVENTION

Field of the Invention

The present invention relates to a novel system to create an easily upgradable network.

Discussion of the Related Art

As the demand for wireless communication and Wi-Fi data transfer speed continues to increase, it becomes necessary to provide reliable area networks for customers. One way to increase network coverage that has been implemented in the art is the creation of small cells. Small cells are typically low-powered radio access nodes that operate in licensed and unlicensed spectrum. The nature of small cells may vary. Generally speaking, a small cell may be referred to as either a micro cell, a pico cell, or a femto. The classification of small cells often depends on the radius of coverage. A micro cell, for example, is viewed as one that covers a radius between 0.2 and 2 miles. A pico cell is one that covers a radius of 300 to 1000 feet. A femto covers a radius of less than 100 feet. A femto is commonly used for household area networks. At the opposite end of the spectrum from small cells are macro cells. A macro cell is a very large network area that typically covers a radius of 2 to 10 miles.

While the various types of small cells have been available, they have a number of drawbacks. One major issue with existing small cells is their limited data transmission speed capability. A typical micro cell is known to have a transmission speed of 50 to 150 Mbps. A pico cell may provide a transmission speed of up to 50 Mbps. As the technology develops, there is an increased demand in data speed and the existing small cells are quickly becoming obsolete.

Another drawback of the existing small cell technology is that it is not upgradable. Once the installed equipment becomes obsolete, the only way to upgrade is by a complete replacement of the hardware. This process becomes very costly and time consuming. This is especially so in a field in which technological improvements come about very quickly.

Another issue with small cells is the type of equipment that is currently used. Some small cells are created using transmitters that tend to be very large in size, expensive, and require ancillary equipment to properly operate. Accordingly, such transmitters can only be placed in areas that provide a large space and sound structural support such as rooftops or other inconvenient locations. These transmitters also provide very localized transmission. Thus, multiple transmitters, upwards to four or more are required to cover an area with a 360° range from where the transmitters are located.

In view of the above issues, a need exists for a new cost effective system that can be easily upgradable and provide high transmission speed local area networks.

SUMMARY OF THE INVENTION

Accordingly, the present invention is directed to a multichannel transmission system that substantially obviates one or more of the problems due to limitations and disadvantages of the related art.

An advantage of embodiments of the present invention may be to provide a higher data transfer speed small cell area networks.

Another advantage of embodiments of the present invention may be to provide a system that allows remote control and operation of devices such as security cameras.

Another advantage of embodiments of the present invention may be to provide an upgradable system to provide local area networks.

Another advantage of embodiments of the present invention may be to provide a multi-frequency area network.

Another advantage of embodiments of the present invention may be to provide a non-carrier dependent area network.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transmission node having a modular structure comprising one or more card slot, each card slot capable of hosting a module, a switch, PoE connectors between the switch and the one or more card slot, and a power source.

In another aspect of the present invention, a transmission site comprising at least one modular transmission node and at least one backhaul.

In another aspect of the present invention, a local area network system comprising a controller, a switch, and a plurality of transmission sites, each transmission site comprising at least one modular transmission node.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to exemplary embodiments some of which are illustrated in the accompanying drawings.

In exemplary embodiments described herein, an upgradable system for local area network with high transfer data speed is provided. As described in more detail below, exemplary embodiments provide a modular structure that allows for the ability to easily and quickly upgrade the system to cover single or multiple transmission frequencies and channels. In exemplary embodiments, the system is cost effective and easily expandable. In exemplary embodiments, transmission nodes use an Ethernet ports to connect to the various modules, thus making the replacement of modules independent of proprietary bus technology. In exemplary embodiments, components, such as network switch and power supplies, are also modular and can be easily upgraded and thus scaled to the desired network requirements. In exemplary embodiments, the upgrade may be implemented in the hardware or in the software aspects of the various components. Exemplary embodiments also provide substantially higher data transfer speed when compared to small cells currently being used.

In an exemplary embodiment the transmission system uses one or more modular transmission nodes. Each transmission node may provide an access point by creating a small cell. Depending on the desired configuration of the transmission system, the transmission nodes may provide access points for network services, wireless data, wireless video, wireless voice, voice over internet protocol (VoIP), local portal for emergency services, mesh node from one transmission to the next, single channel transmission, multichannel transmission, 2.4 GHz 802.11n and 5 GHz 802.11 ac Wi-Fi access, as well as a number of other like services. In exemplary embodiments, the system may provide the 2.4 GHz wireless access at a range of a 500 m in line-of-sight (LoS) and at a range of 200 m for non-line-of-sight (nLoS). In an exemplary embodiment, the system may provide the 5 GHz wireless access at a range of 350 m LoS and at a range of 150 m nLoS. The implementation of access points is not limited and the above are provided solely as exemplary. The system may be configured to provide access points to any number of desired services.

The transmission nodes can be designed to be installed on various structures. For example, the transmission nodes may be affixed to walls, buildings, poles or any like structure. For illustrative purposes, in an exemplary embodiment the modular transmission nodes may be affixed to light poles. However, this is simply an illustrative example and should not be viewed as limiting.

Figure 1:
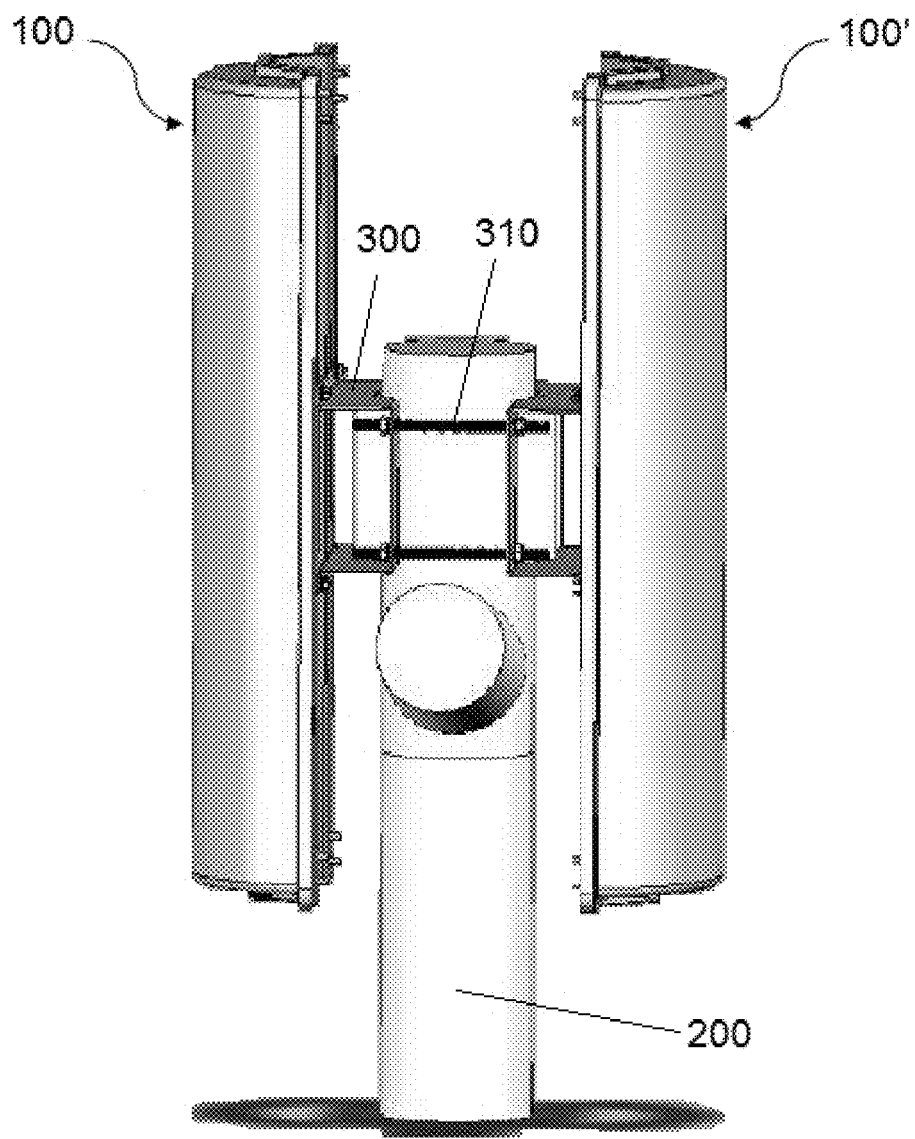
FIG. 1 is an exemplary embodiment of a pair of transmission nodes as described herein mounted on a pole structure.

An exemplary embodiment where the transmission node is affixed to a pole is illustrate in FIG. 1. In an embodiment, a transmission node mounted on a pole may be approximately between 8 and 15 meters from the ground. In an exemplary embodiment, the transmission node may be installed to have a line of sight of approximately 350 meters. The height and line of sight ranges may be modified. For example, in an embodiment, the line of sight of a transmission node may be 200 meters or less. In an exemplary embodiment the line of sight may be 5 meters, 10 meters, 15 meters, 20 meters, 30 meters, 50 meters, 70 meters, 100 meters, 125 meters, 150 meters, or 175 meters.

In the illustrated embodiment of FIG. 1, transmission nodes 100 are shown as affixed to pole 200 through a bracket 300 and screws 310. The method of affixing the transmission nodes to a base structure, such as pole 200, should not be limiting. As will be discussed in more detail below, transmission nodes 100 may be designed to mate with different brackets so that they can be easily affixed to different structures. Any combination of screws and brackets may be employed. The design of the brackets is not limiting. In exemplary embodiments, the brackets may be clamps designed to be mounted on a pole like structure. The brackets may be clamps. The brackets may be hold in place using screws or other like fastening devices. The brackets may engage the chassis of the transmission node using screws, studs or other like devices. Preferably, the brackets are designed to have sufficient structural integrity to support the one or more transmission nodes in a fixed position. The determination as to what securing device is used may be dependent on the nature and size of the structure upon which the transmission nodes are mounted. Pole 200 shown in FIG. 1 is also only an exemplary structure as discussed previously. Also, any available pole with sufficient structural integrity to support the one or more transmission nodes may be used.

For illustrative purposes the exemplary embodiments described herein will assume that pole 200 is a light pole or other like utility pole such as traffic light pole or a wooden utility pole. An advantage of using light poles or traffic light poles is that they provide a power source and are evenly, closely, and frequently spaced throughout different areas.

The number of transmission nodes used and their arrangement may be dependent on the desired transmission range. Although FIG. 1 exemplifies the mounting of two transmission nodes, this is only exemplary. Different numbers of transmission nodes may be mounted on any one supporting structure that has sufficient space and structural integrity to support them. In the exemplary embodiment shown in FIG. 1, the two transmission nodes may be sufficient to achieve a 360° transmission range if cascaded and oriented at 180° from each other. If the supporting structure were much larger, it may take more than two transmission nodes to achieve the same 360° range. In other instances, it may be desirable to instead only cover a 180° range. In such instances, a single node may be used. An exemplary embodiment of using a single node may be when mounting the transmission node on a wall to provide transmission range within an area defined by the wall. For example, a stadium may include a series of transmission nodes mounted on the internal walls to provide transmission range within the stadium. The possible combinations of number of transmission nodes and their orientation should, therefore, not be viewed as limiting. The transmission nodes may be designed to cover various transmission ranges. For example, a transmission node may be made to cover only a 90° range. The number and arrangement of the card slots and modules being used within any one transmission node as discussed below may be varied based on the desired coverage range and desired application. Likewise, the overall size and shape of a transmission node may be varied as desired.

In exemplary embodiments, each transmission node may be divided into sectors. In exemplary embodiments, each sector may extend lengthwise with respect to the transmission node. In exemplary embodiments, the sectors may be oriented at 90° from each other. Each sector may focus one or more radio frequencies and channels to service individual subscribers based on bandwidth requirements.

Figure 2:
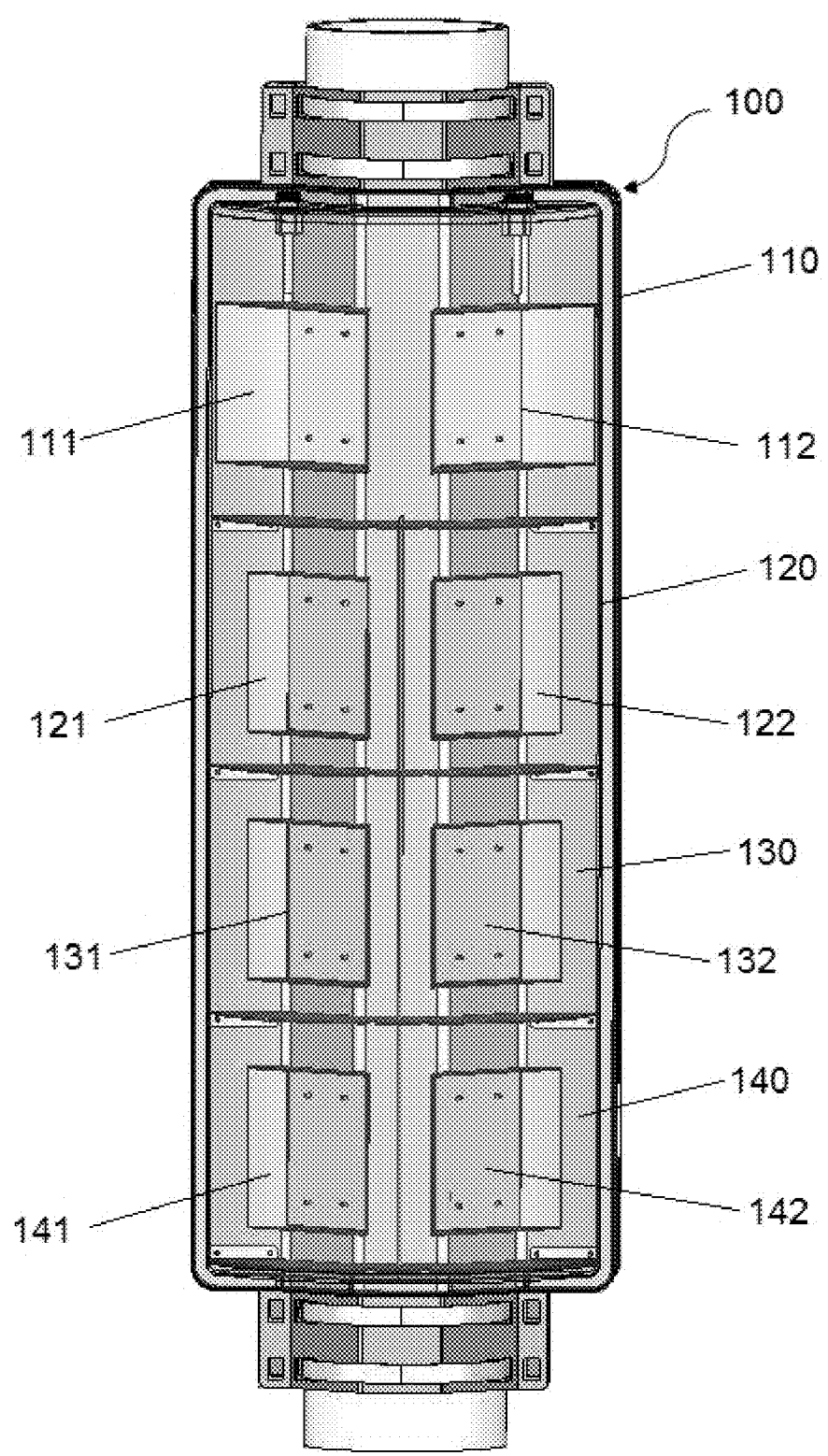
FIG. 2 is the cross-sectional view of an exemplary embodiment of a transmission node.

FIG. 2 illustrates a cross sectional view of an exemplary transmission node 100. The structure may be modular in that it is arranged so that it may host multiple modules. In an exemplary embodiment a transmission node may include eight modules arranged in four levels for each sector. Thus, in an exemplary embodiment wherein a transmission site includes two transmission nodes as illustrated in FIG. 1, the transmission site may include 16 modules. The modules may include RF modules, switch modules and power modules. In an exemplary embodiment, each of the RF modules, switch module and power module are field upgradable. Thus, allowing for the upgrading of the transmission node as desired by simply adding, replacing, or upgrading the independent modules instead of replacing the whole transmission node. In an exemplary embodiment the transmission node may be upgraded by replacement or addition of independent RF modules. In an exemplary embodiment, the transmission nodes may be scaled to meet the required transmission needs by simply replacing, upgrading or adding the appropriate RF modules.

For the purposes of this specification, an RF module is an electronic circuit which is used to receive or transmit radio waves on one of a number of carrier frequencies and channels. Typical RF modules tend to come in standard sizes and thus can be interchanged to achieve different functions.

In an embodiment, the transmission node 100 may include two 90-degree sectors with four separate rows 110, 120, 130, and 140. The size and arrangement of the sectors and of the number of rows are only illustrative and should not be viewed as limiting. For application on a light pole, a four row arrangement is preferred. However, larger or smaller transmission nodes may be implemented with more or fewer rows.

Each of rows 110, 120, and 130 may include two card slots (111, 112, 121, 122, 131, and 132), one card slot per sector, each card slot able to host an RF module. In the illustrated embodiment, the transmission node may include six card slots, 111, 112, 121, 122, 131, and 132, to host up to six RF modules, with three card slots, 111, 121, and 131 in one sector and three card slots, 112, 122, and 132, in the other sector. Like the number of rows, the number of sectors and the number of card slots should not be viewed as limiting. A greater or smaller number of sectors and card slots and their arrangement may be implemented as may be desired. Also, in an exemplary embodiment, the card slot size is designed to host an RF module of standard sizes. The card slots may also be designed to fit non-standard size RF modules. In an exemplary embodiment, the card slots may be replaceable or modifiable so as to fit future generation RF modules sizes and designs.

The transmission nodes are not limited to the type of RF modules used. In exemplary embodiments, each RF module may be equipped with an internal antenna. Each antenna may be used to broadcast or receive modulated signals. A user or subscriber may then demodulate, demultiplex, and select one channel from the received modulated signal. Each RF module may broadcast all of the independent modulated signals at one of a set of operating frequencies such that adjacent RF modules broadcast at different operating frequencies.

Each RF module may be able to provide an RF signal. In an exemplary embodiment, RF modules may be combined. For example, RF modules 2.4 GHz 802.11n and 5 GHz 802.11ac may be combined into a single module. In so doing the combined module may be hosted in the card slot provided in the transmission node. A combined RF module may have a single antenna for both frequencies. In an alternative embodiment, a combined RF module may have two antennas, one for each frequency transmission.

In an exemplary embodiment a combined RF module 2.4 GHz 802.11n & 5 GHz 802.11ac may provide a 2.4 GHz/5 GHz dual band access point. The 2.4 GHz may be a 2×2 802.11n, with a max 27 dBm combined transmission power and a 90 dBm @ MCS0-HT20 receive sensitivity. As used above, the '2×2' means two transmitting antennas and two receiving antennas providing the capability for two spatial data streams. In a more general sense, the nomenclature 'N×N' represents an N number of transmitting antennas and N number of receiving antennas providing the capability for an N number of spatial data streams. The 5 GHz may be a 2×2 802.11ac/802.11n, with a max 25 dBm combined transmission power and a 90 dBm @ MCS0-HT20 receive sensitivity. The combined RF module may also include 16 service set identifiers (SSID) for each band (2.4 GHz and 5 GHz). In the exemplary embodiment, the RF module can provide for up to 128 concurrent clients. The RF module may also provide for 3G/4G co-site protection.

In an exemplary embodiment, the RF module may include a dual band antennas with a gain of 2.4 GHz>10 dBi, and 5 GHz>13 dBi. The dual band antenna may be provided with an optional down-tilt on vertical. The down tilt may be between 0° and 10°. In an exemplary embodiment, the down tilt may be 1°, 2°, 3°, 4°, 5°, 6°, 7°, 8°, 9°, or 10°. Greater down tilt may also be implemented if necessary. The dual band antenna may also operate with a dual linear polarization.

In an exemplary embodiment, a combined RF module may also support point to point (P-to-P) transmission as well as point to multipoint (P-to-MP) transmission. The combined RF module may be design to operate within a temperature range of −40° C. and 65° C. In an exemplary embodiment, a combined RF module may powered by a power over Ethernet (PoE) as described in more detail below. A combined RF module may also be designed to operate at <18 W.

Other exemplary RF modules may include 3.65 GH/Small Cell or cellular module. The RF modules may also include a 4.9 GHz Public Safety Band module. In another exemplary embodiment RF modules may include an 800 MHz small cell. Each transmission node, may include any one or more of different types of RF modules. Any RF module that can be hosted by the card slots may be used. Exemplary embodiments of the transmission node provide the ability to upgrade with the use of newly developed RF modules. Thus, in an exemplary embodiment configurations may include 802.11ac and may evolve to long term evolution (LTE) and other technologies and frequency bands.

In an exemplary embodiment the configuration of the transmission node may evolve into various synchronization solutions. For example, the configuration may evolve into an LTE small cell integration frequency-division duplex (FDD). In an alternative embodiment the configuration may evolve into LTE small call integration time division duplex (TDD). In yet an alternative embodiment, the configuration may evolve into a combined LTE FDD/TDD small cell integration.

Also, systems that can reduce effective bandwidth of a broadcast signal may be implemented in exemplary embodiments. For example, in an embodiment, the transmission node may be designed so as to include a system that is able to multiplex selected channels signals into single digital bitstreams. By reducing the bandwidth of the broadcast signal the system may be able to offer program providers the flexibility to add channels within the broadcast spectrum. An exemplary of this technique along with other related broadcasting techniques that may be implemented in exemplary embodiments described herein are provided in U.S. Pat. No. 6,243,427, which is incorporated herein by reference in its entirety.

Each card slot may host an RF module and can be oriented as desired. In an exemplary embodiment the RF modules fit flat into the card slots. In alternative embodiments the RF modules do not fit flat into the card slots. Also, the attitude of each card slot may be adjusted based on the desired focus area of the transmission. In an exemplary embodiment, the attitude adjustment of the one or more card slots may be dependent on the location of the transmission node.

Attitude adjustments may be implemented in various manners. In an exemplary embodiment, attitude adjustments may be implemented with the use of spacers. In an exemplary embodiment the attitude of one or more of the card slots may be adjusted between 0° and 10°. In other exemplary embodiments the adjustment of one or more card slots may be between 0° and 20°. Alternatively, the attitude adjustment may be between 0° and 30°. The attitude adjustment may be even greater depending on the circumstances. In some embodiments the attitude adjustment may be as high as 90°. In exemplary embodiment the attitude adjustment of one or more card slots is 1°. In an alternative embodiment the attitude adjustment may be 2°, 3°, 4°, 5°, 6°, 7°, 8°, 9°, 10°, 11°, 12°, 13°, 14°, or 15°.

In an embodiment the card slots may allow for the replacement of any of the hosted RF module. This may provide the ability to easily upgrade or reconfigure the transmission node as desired.

Figure 3:
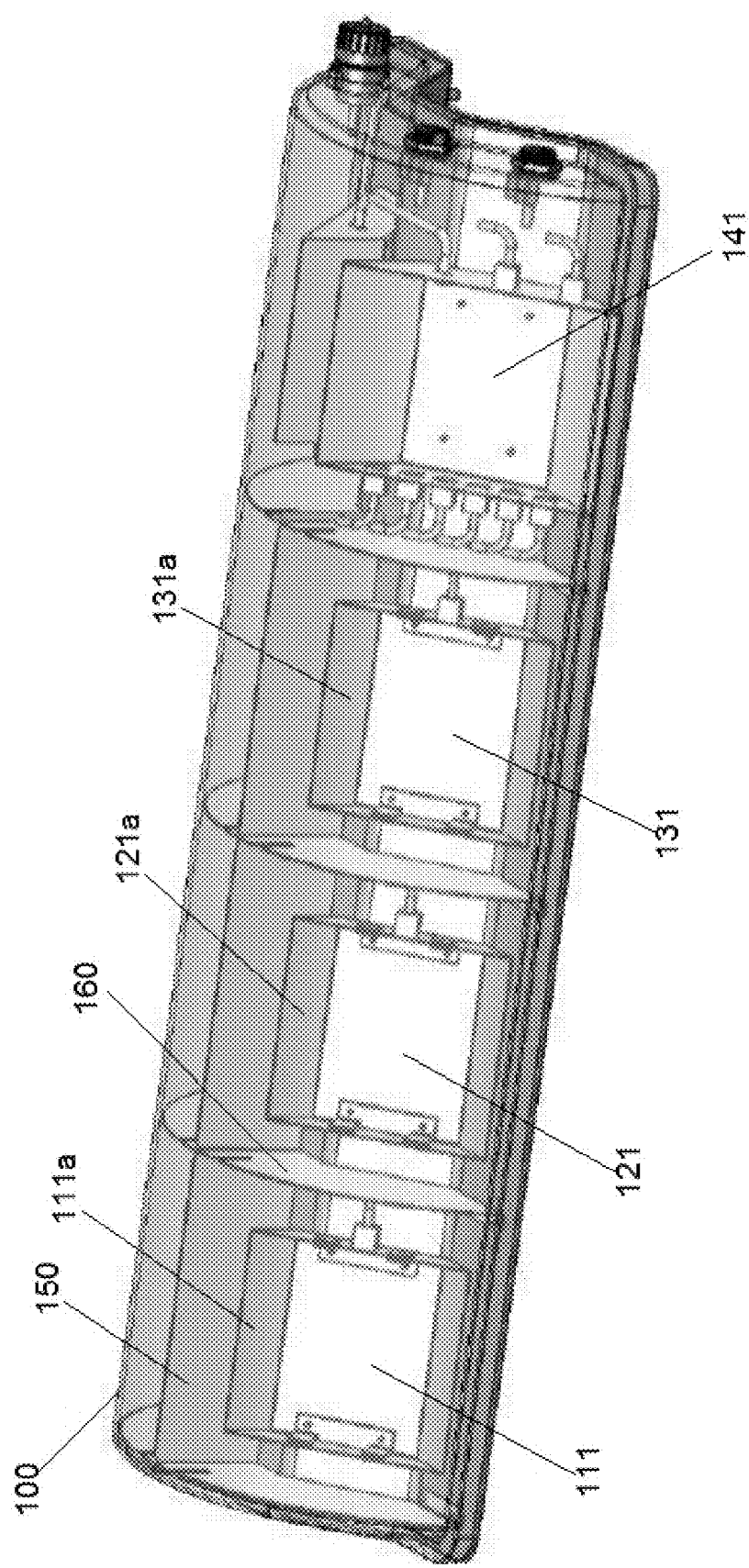
FIG. 3 is a perspective view of a cross-section of an exemplary embodiment of a transmission node.

In order to lower interference between the different RF modules, the transmission node may include RF shields. In an exemplary embodiment the shields may surround each RF module so as to isolate the various RF modules located in each transmission node. In one embodiment, the shield may be provided by the card slot. In one embodiment, shields may be provided between each row. In one embodiment, shields may be provided between sectors. Exemplary embodiments may make use of multiple shields to isolate each RF module. As shown in FIG. 3, each of card slots 111, 121, and 131 may be sheet metal and designed to have a sidewalls 111a, 121a, and 131a respectively that encase each RF module. Also, as shown in FIG. 3, a shield 150 may be provided between card slots of different sectors. For example, shield 150 may be located between card slots 111 and 112, between card slots 121 and 122, and between card slots 131 and 132. In an exemplary embodiment, a shield 160 may also be provided between rows. As illustrated in FIG. 3, a shield 160 may separate card slots 111 from 121, and card slot 121 from card slot 131. Shields 160 may extend across the two sectors and thus also separate card slot 112 from card slot 122, and card slot 122 from card slot 132. In exemplary embodiments wherein a transmission node include more rows or sectors, the same shielding arrangement may be repeated to achieve the same isolation as shown in FIG. 3. Also, the amount of shielding is not limited. Additional or fewer shields may also be implemented based on the level of isolation desired.

In an exemplary embodiment, each transmission node is designed to achieve a 180° transmission range. This may be achieved by arranging the sectors at 90° from each other and including the same RF modules in each sector. For example, a combined RF module 2.4 GHz 802.11n & 5 GHz 802.11ac may be included in card slot 111 and one in slot 122. Similarly, other types of RF modules may be arranged in both sectors. By arranging an RF module only in one sector the same transmission node may be made to transmit only over a 90° range.

Figure 4:
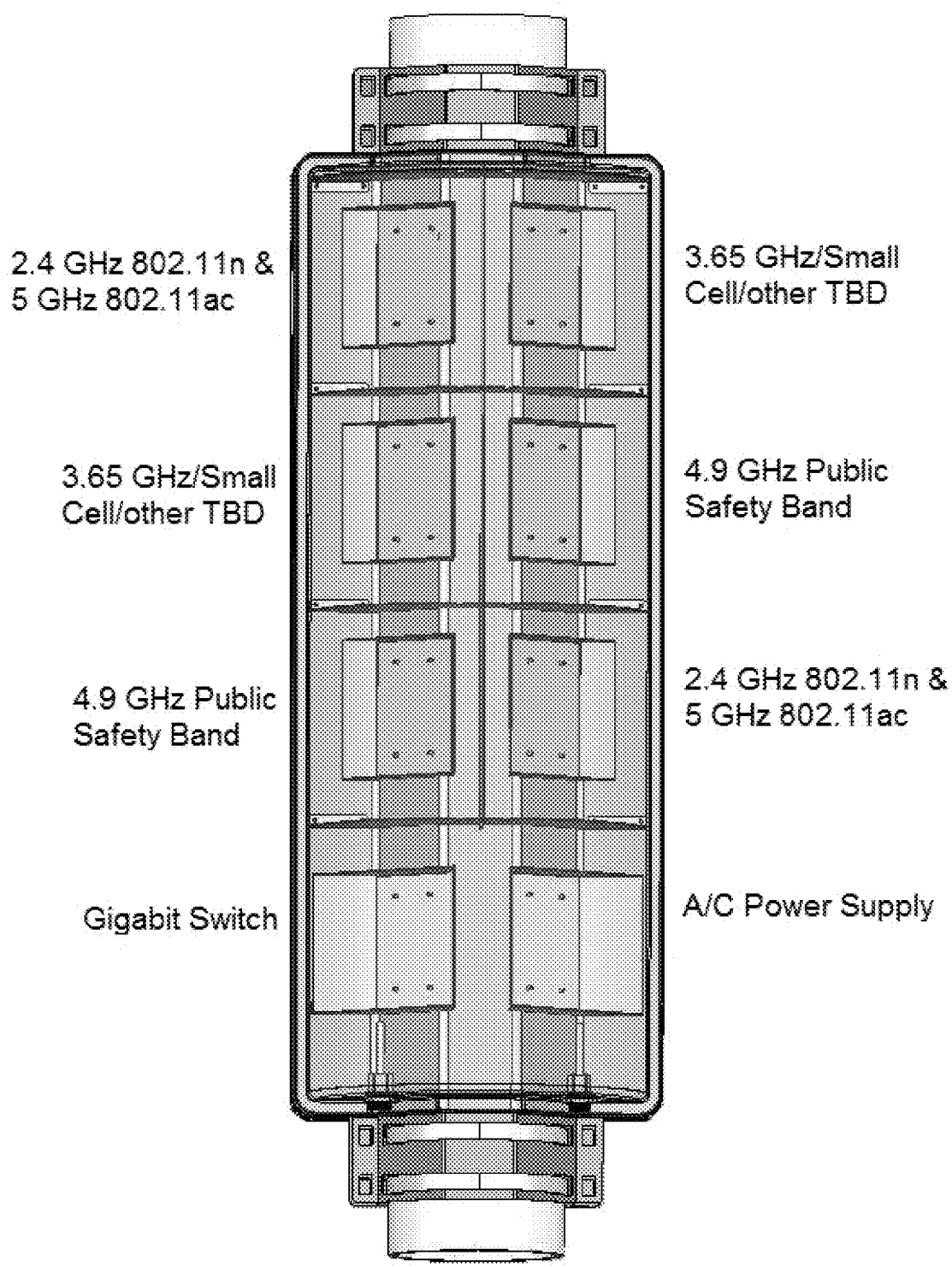
FIG. 4 is an exemplary representation of the arrangement of RF modules in a transmission node.

An exemplary arrangement of multiple RF modules in both sectors is illustrated in FIG. 4. In this exemplary embodiment, to reduce interference, the RF modules may be arranged so that the same RF module type is not on the same row. An advantage of such arrangement may be a decrease in interference. For example, if the transmission node were to include three pairs of different RF modules, such as a pair of combined 2.4 GHz 802.11n and 5 GHz 802.11ac modules, a pair of 3.65 GHz modules, and a pair of 4.9 GHz modules, then the RF modules may be arranged as follows. One combined 2.4 GHz 802.11n and 5 GHz 802.11ac module located in card slot 111, and the other combined module located in card slot 132. One of the 3.65 GHz modules located in card slot 121, and the other located in card slot 112. Finally, one of the 4.9 GHz modules located in card slot 131, and the other located in card slot 122. Various additional arrangements may also be implemented that maintain the RF modules of each pair on different rows.

Figure 5:
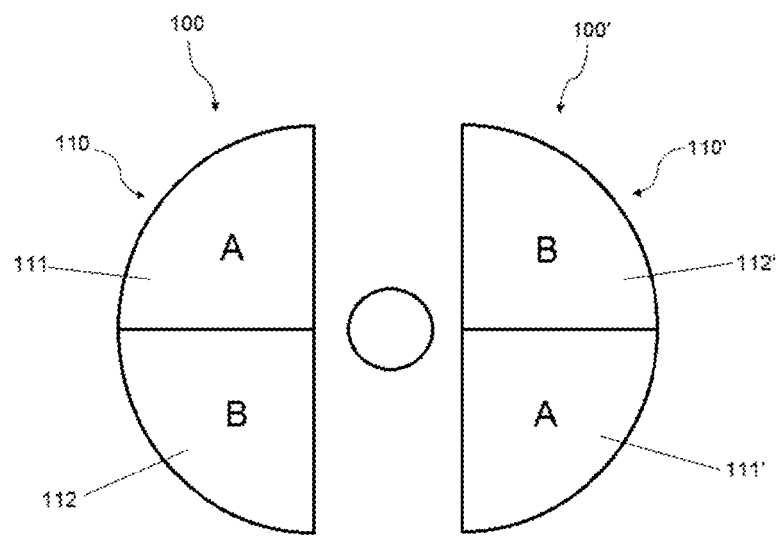
FIGS. 5(a)-5(c) are top-down view of various rows of an exemplary pair of transmission nodes that provide an possible arrangement of RF modules.
Figure 5:
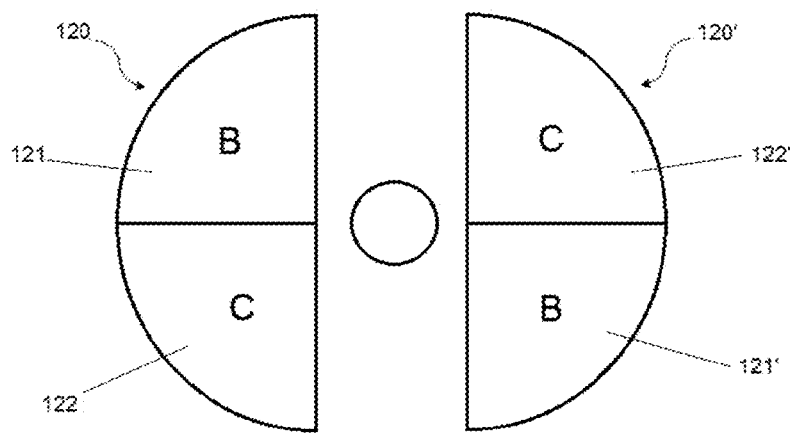
Figure 5:
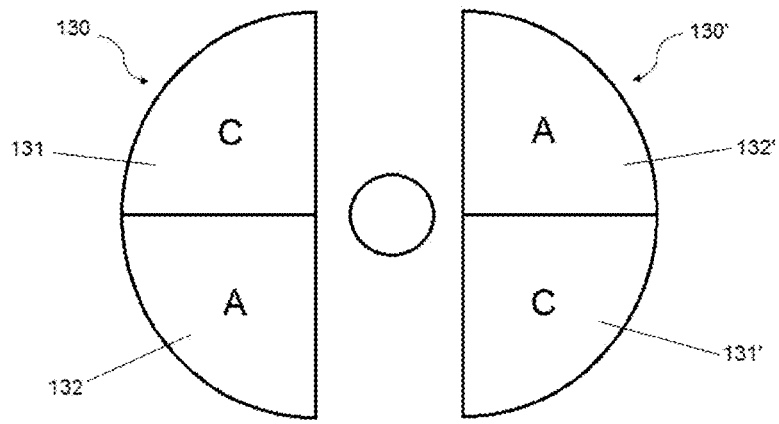

The arrangement of the RF modules may also be designed so as to better prevent interference between closely arranged transmission nodes. For example, in an embodiment in which two transmission nodes are mounted on a pole structure as shown in FIG. 1, the RF modules located in one transmission node may be arranged so as to be at 180° from the same RF modules located in the other transmission node. An exemplary embodiment of such arrangement is shown in FIGS. 5(a)-5(b). These figures provide a top view of two exemplary transmission nodes 100 and 100' arranged as illustrated in FIG. 1. For illustrative purposes only, the exemplary transmission nodes are assumed to have four rows, with the top three rows of each transmission node containing two RF modules, one per sector. The bottom row of each exemplary transmission node 100 and 100' are not shown, but as discussed in more detail below, the bottom row of each transmission node may be used to include a switch and a power module.

FIGS. 5(a)-5(b) illustrate the top row, i.e. row 110, and two middle rows, i.e. rows 120 and 130 of transmission nodes 100 and respective rows 110', 120', and 130' of transmission node 100'. The types of RF modules is not particularly limited and were already discussed above. For illustrative purposes, each transmission node 100 and 100' is assumed to have the same three types of RF modules, A, B, and C. As discussed above, to also decrease interference, no two of the same RF modules are arranged on the same row within each transmission node. Thus, transmission node 100, may be arranged to have RF modules A and B on row 110, RF modules B and C on row 120, and RF modules C and A on row 130 as illustrated.

To minimize interference between transmission node 100 and transmission node 100', the RF modules in transmission node 100' may be arranged at 180° or diagonally opposite the locations of the RF modules present in transmission node 100. Thus, as illustrated in FIGS. 5(a)-5(c), each row of transmission node 100' may include the same RF modules provided in the respective row of transmission node 100, but located at diagonally opposite location. Thus, RF module A located in card slot 111 of transmission node 100 is 180°, or diagonally opposite RF module A located in card slot 111' of transmission node 100'. Similarly, RF module B located at card slot 112 is 180° from RF module B located at card slot 112'. In a similar manner, RF module B located at card slot 121 is 180° from RF module B locate at card slot 121'. RF module C located at card slot 122 is 180° from RF module C located at card slot 122'. RF module C located at card slot 131 is 180° from RF module C located at slot 131'. Finally, RF module A located at card slot 132 is 180° from RF module A located at card slot 132'. This arrangement is only illustrative and other arrangements may also be implemented. In the above described exemplary embodiment it may be possible to obtain a 180° transmission range by each transmission node, thus obtaining a full 360° combined transmission range with minimal interference between RF modules within each transmission node and between the two transmission nodes.

In addition to interference between RF modules within the same transmission node and between RF modules of closely placed transmission nodes, in an exemplary embodiment the system is also able to adjust to avoid interference from third party frequencies. The system may be able to automatically adjust by moving the noise floor to the detected third party interference level, and monitoring the received signal for signal levels at least 20 dB above the noise floor, referred to as a 20 dB signal-to-noise ratio ("SNR"). This translates to the detection of only signals with at least 10 times more power than the noise defined by dB=20 log(Ps/Pn), where Ps=power of signal, and Pn=power of noise. For example, if the noise floor was determined to be at −54 dB, then the expected signal detection level to avoid interference would be −34 dB (i.e., a 20 dB SNR). In an alternative embodiment, the adjustment may be made manually. In yet another exemplary embodiment, the system may allow adjustment to be made manually and automatically.

At row 140, instead of providing two card slots, the illustrated transmission node may include a switch module ("switch") 141 and a power supply module ("power module") 142. While the illustrative example shows row 140 to be at the one end of the transmission node, this embodiment should not be viewed as limiting. Other arrangements of the various rows may also be provided. Also, in exemplary embodiments, the switch and power supply may be provided on separate rows of the transmission node. Also, as illustrated in FIG. 3, the switch and power supply may be equally isolated using RF shields as the RF modules so as to prevent any potential interference. In an alternative exemplary embodiment the power supply and switch may be provided separately from the transmission node.

In an exemplary embodiment, the switch may be a power over Ethernet (PoE) switch. PoE may be used to provide both data and power connections in one cable. The nature of the switch is not limiting. In an exemplary embodiment the PoE switch is a standard device. The PoE switch may contain active, smart, or managed power management features to reduce AC draw of all devices involved. In an embodiment the PoE switch may also include processing capability to act as a controller. In an exemplary embodiment, switch 141 may be software upgradable. In an embodiment, switch 141 may be upgraded to support cloud based services and/or to operate using a cloud controller. In an exemplary embodiment, switch 141 may be designed to support local applications such as VoIP and other ancillary services. In an exemplary embodiment, switch 141 may support SNMP and HTTP standards. In an embodiment, switch 141 may support virtual local area network VLAN standard 802.3P/Q.

In an exemplary embodiment, switch 141 may include processing capabilities that can achieve increased data transfer through RF channel aggregation. Receiver channel aggregation is the combination of a plurality of carrier channels into a single stream of data at the receiver, but requires additional power and tight timing tolerance so that the data from the plurality of channels can be properly pieced back together. Transmission channel aggregation is the opposite, taking one stream of data and splitting it over a plurality of carrier channels, likewise requiring additional power and tight timing tolerance. Either type of RF channel aggregation comes with a cost, as the circuitry is more complex to handle the multiple data paths, timing tolerances, increased power demands, and interference isolation. Since the throughput of the transmission or reception can be increased proportional to the number of channels aggregated, the increased data rate may outweigh the increased cost to achieve.

In an exemplary embodiment, switch 141 may be a PoE switch, with 10 Gigabit Ethernet (GE) ports interface PoE. In an embodiment, switch 141 may include six 18V/24V PoE, for total of less than 10 W for the RF modules. In an embodiment, switch 141 may include 8 GE ports with 802.3at PoE to connect to the RF modules. An alternative embodiment may use GE ports with 802.3af PoE. The PoE standard, however, should not be viewed as limiting. Switch 141 may supply up to 25.5 W maximum power to each RF module for a total of 150 W. Switch 141 may further include one GE port for uplink, and optionally one cascade GE port for inter-chassis link, i.e. interconnection of transmission nodes. Switch 141 may control the wire speed switching between all ports. Switch 141 may also include a 48V DC input. Switch 141 may include at least one USB port. USB ports may be used for a variety of applications. Switch 141 may also be equipped with an LED indicators. In an exemplary embodiment switch 141 may include two LEDs for each port. Switch 141 may further be designed to safely operate at temperatures that fall between −40° C. and 65° C. The hardware of switch 141 may be able to fully manage switching. Initial software may also support basic L2 switching. In an exemplary embodiment, switch 141 may include an integrated, high performance processor useful for software features upgrading.

Figure 6:
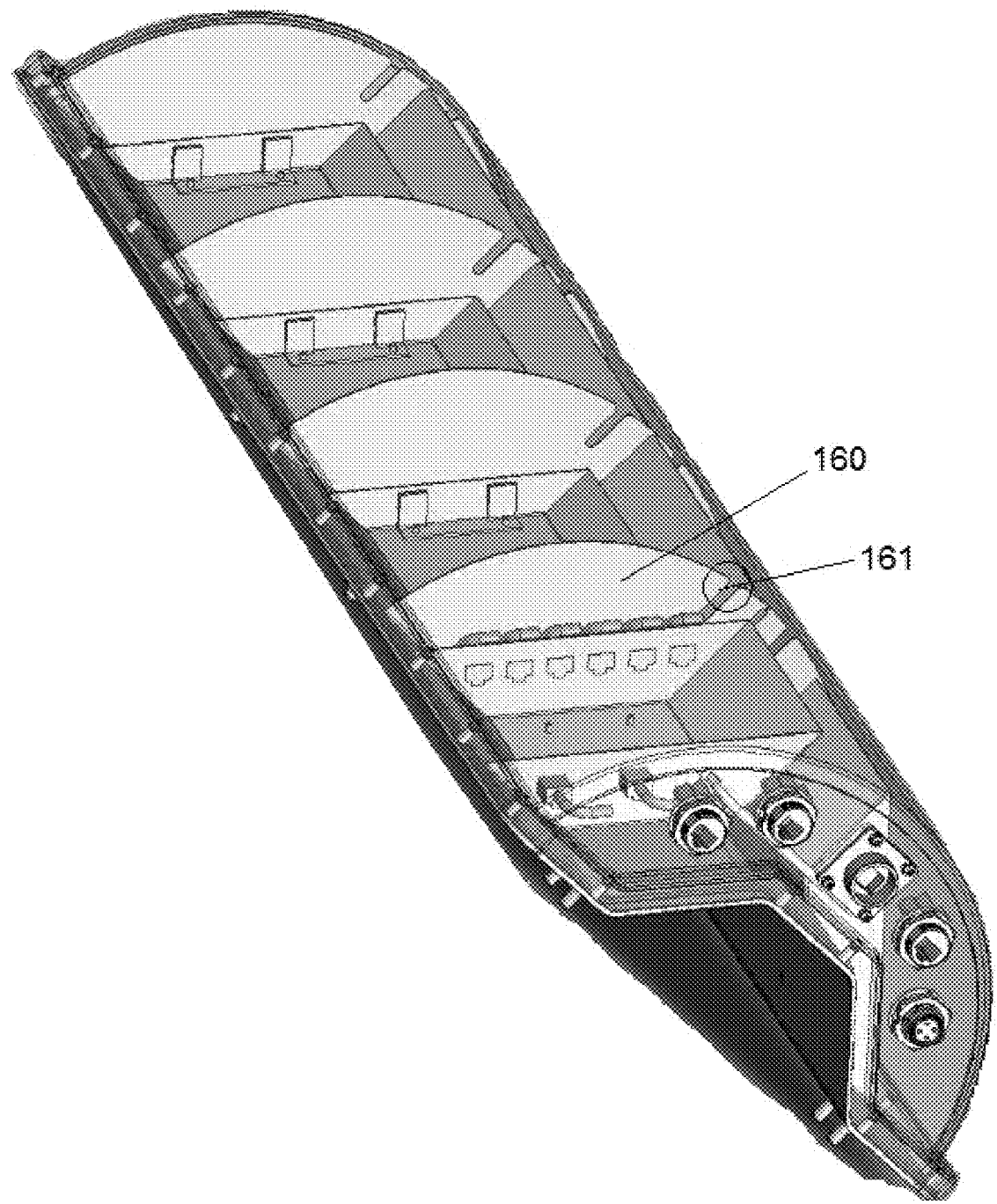
FIG. 6 is a perspective view of the internal exemplary shields in an exemplary transmission node.

Switch 141 may be connected to the RF modules located at card slots 111, 112, 121, 122, 131, and 132, using connectors. In an exemplary embodiment, the connections is made using an Ethernet Bus system. In an exemplary embodiment shown in FIG. 6, shields 160 may be provided with slots 161 to accommodate the Ethernet cables extending from the switch to the card slots.

External sources may be connected to switch 141 using one or more ports. In an exemplary embodiment shown in FIG. 6, the ports may include Ethernet connection ports, ports for Gigabit Passive Optical Network (GPON) or other fiber optics, such as, for example, small form-factor pluggable (SFP) ports. Other ports may also be implemented. In an exemplary embodiment, a transmission node may be provided with multiple ports to accommodate various connections to switch 141. The ports may be all the same or different. In the illustrative embodiment, the transmission node may include three Ethernet ports and one SFP port. In an embodiment the three external sources Ethernet ports may be 802.11at PoE.

The ports may be used to interconnect different transmission nodes. In an exemplary embodiment a PoE connection using the PoE ports may be used to cascade two or more transmission nodes using inter-links. The ports, including PoE and SFP ports, may also be used to connect the transmission nodes to backhauls. In exemplary embodiments, additional devices may also be connected to the transmission nodes using the various connection ports. For example, a device such as camera, a speaker, microphone or like devices may be connected to the transmission nodes via the aforesaid ports. In an exemplary embodiment, the transmission node may be connected to a security camera using a PoE connection. In this latter embodiment, the connection to the camera through the transmission node may provide full access and control over the network of the security camera. Likewise, access and control over the network may be achieved of any other device, including those identified above, connected to a transmission node. Also, the ports may be used to connect the transmission nodes directly to a network. For example, an SFP port may be used to connect to a network using fiber optic cables.

In exemplary embodiments, the transmission node may be equipped with an integrated AC power module 142. The design of the power module should not be viewed as limiting. In an exemplary embodiment, power module 142 may have a single AC input of 110 V/60 Hz, 250 W. In an alternative embodiment the input may be 110V/60 Hz, 500 W. The module may be capable of outputting 48V DC current, 150 W. Power module 142 may also include an alarm input. Also, power module 142 may be designed to operate within a temperature range of −40° C. and 65° C.

Power to power module 142 may be provided from any suitable external source via a power connector. In an exemplary embodiment, one or more power connectors may be provided in the proximity of the PoE and SFP ports. In the exemplary embodiment shown in FIG. 6, the power connector, the PoE ports and the SFP port may all be located at one end of a transmission node.

The external power source is not limited and can be any viable and suitable source of power. In an exemplary embodiment, the transmittal node may be installed on a street light pole. In such an embodiment, power may be obtained directly from the street light pole. For example, a power module may be installed in the street light pole with a cable running to the one or more transmission nodes installed on the pole.

In an exemplary embodiment wherein only one transmission node is installed on the street light, a standard cable may be used to connect the power from the street light to the transmission node.

In an embodiment having two or more transmission nodes installed on a street light pole, various power connections arrangements may be implemented. One exemplary arrangement may be to have a separate power cable independently connecting the power source to each transmission node. In an alternative embodiment, a power cable may be split into multiple cables, either by design or by using an intermediate connectors, so as to connect to each of the two or more transmission nodes. In yet an alternative embodiment, each transmission node may be equipped with multiple power input/out ports. With such arrangement, one standard power cable may be used to connect the power source to one transmitter node and then jumper cables may be used to transfer the power from one transmission node to the next. The ability to connect one or more transmission nodes to power can be designed with multiple variations. Thus, the above exemplified connections should not be viewed as an exhaustive list.

Figure 10:
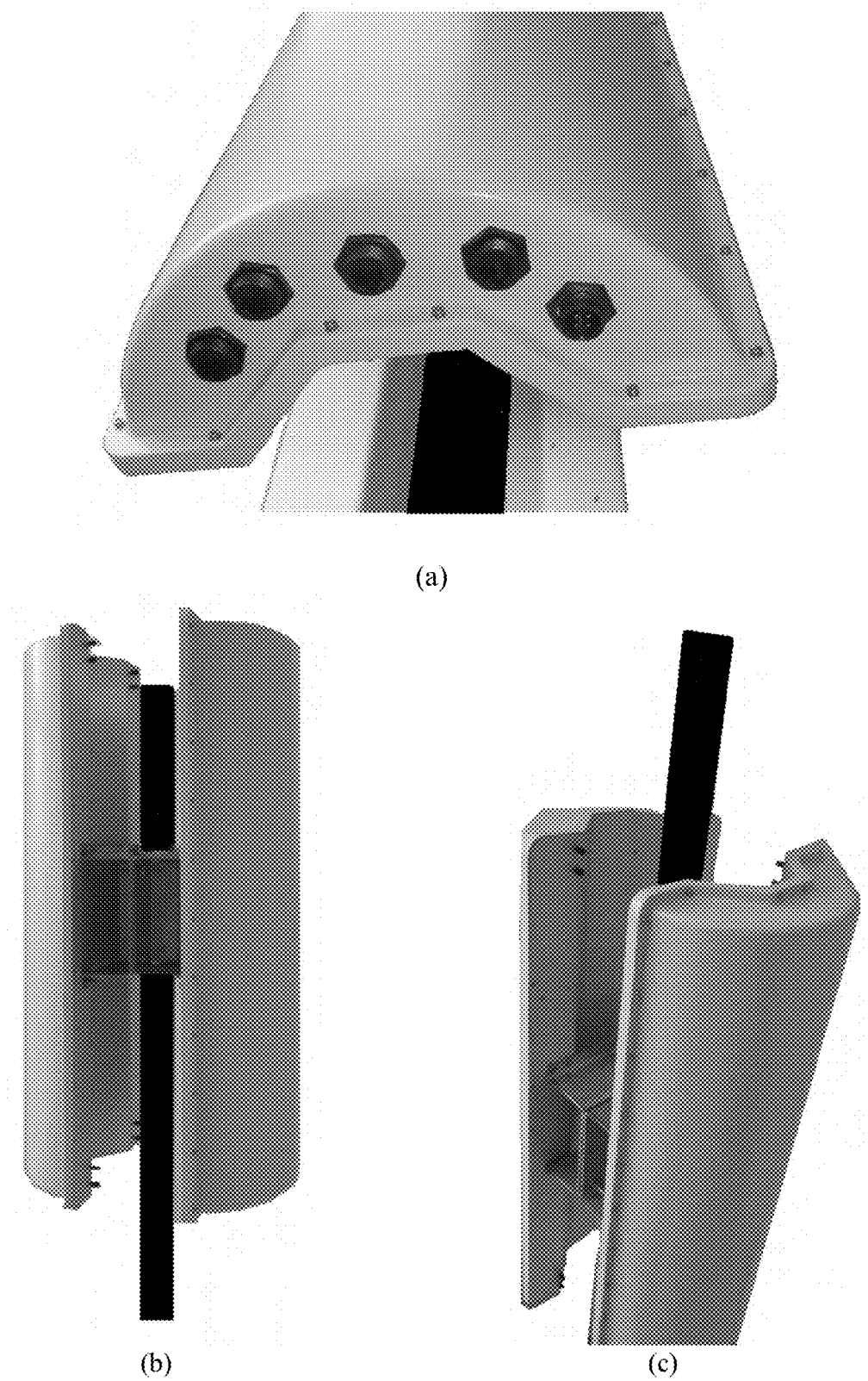
FIGS. 10(a)-10(c) are an exemplary reproductions of exemplary embodiments of transmission nodes.

The chassis used for the transmission node is not limited to any particular design or material. Any chassis design that can accommodate the modular components in the desired arrangements may be used. Also, any material sufficiently resilient to the elements and that can provide adequate structural support may be used. In exemplary embodiments the chassis may be formed by the combining four separate elements, a front portion, a back portion, and two end portions. In alternative embodiments, any two or more portions may be combined into an integral structure. For example, in an exemplary embodiment the chassis may be formed by only two portions, a back portion and a front portion, that when combined form a hollow enclosure able to house the inner components of the transmission node. In an exemplary embodiment, as illustrated in FIGS. 1-5 and 10(a)-10(c), the chassis may include front portion having an elongated rounded front outer surface and a back portion having a surface adapted to engage one more bracket systems. The views provided in FIGS. 10(a)-10(c) show all of the material design elements of the exemplary design. For example, even though certain surfaces are not shown, the various elements may be symmetrical about their axes, as shown in the figures, and the various surfaces not shown may be consistent with those shown. Furthermore, it should be appreciated that the various connectors, screws and ports may not be part of the preferred design. In place of those various connectors, screws, and ports, the design may be considered to include a surface consistent with the surface surrounding such various connectors, screws, and ports. In the illustrated exemplary embodiments, the front portion may include flat top and bottom ends and designed so as to form a hollow enclosure to house the transmission node internal components discussed previously when attached to the back portion. In other exemplary embodiments, the top and bottom ends may be separate portions. An advantage of the design exemplified in FIGS. 1-5, and 10(a)-10(c) is the ability for the transmission node to be mounted seamlessly on structures resembling a pole shape.

The front and back portions of the chassis may be affixed using screws or other similar fasteners. In exemplary embodiments, the front and back portions may be affixed using an adhesive. In the event the end portions are separate, those portions may also be affixed using screws or other similar fasteners or adhesives. In exemplary embodiments, the various portions of the chassis may be designed to engage each other. For example, the chassis portions may be designed to slidably engage. In alternative embodiments, the chassis portions may be designed to engage through a snap fit. In alternative embodiments, the chassis portions may be affixed through a combination of engaging each other and using fasteners and/or adhesives.

The internal components of the transmission node discussed above, such as the card slots, RF shields and other structures may be affixed to the inner portion of the chassis by any available means. In exemplary embodiments the internal components may be attached to the inner surface of the chassis using fasteners such as screws or like the devices. In alternative embodiments, appropriate adhesives may be used. In an exemplary embodiment, the internal components are affixed to the internal surface of the back portion of the chassis. In embodiments, the internal components may be affixed to other inner portions of the chassis, for example to either end portion and/or to the front portion of the chassis.

In exemplary embodiments, the chassis is designed to allow easy access to the inner components so as to allow for the upgrading of the modules residing within the chassis. In an exemplary embodiment, easy access to the internal modules may be provided by making one of the chassis portions of the transmission node easily removable. For example, the front portion may made to be simply removed after removal of fasteners, such as screws, that may be used to keep the front portion attached to the rest of the chassis structure. In alternative embodiments, the any one portion of the chassis may be slidably removable from any of the other portions. In alternative embodiments, the chassis may be provided with an access door. The portions of the chassis may also be designed to be easily replaceable. This may be advantageous in the event an upgrade were to require it. For example, if additional ports were to be added, in exemplary embodiments, the portion of the chassis that hosts the ports may be replaced with one having more perforations to accommodate the additional ports. In exemplary embodiments, the additional ports may be accommodated in the front portion or the back portion of the chassis, or at either end of the chassis. In yet alternative embodiments, the portion of the chassis where the ports are located may include additional pre-designated locations to add more access perforations for additional ports. For example, using punch through designated areas. In the exemplary embodiment illustrated in FIGS. 1-5, and 10(*a*)-10(*c*), the ports are accommodated at one end of the front portion of the chassis.

The back portion of the chassis may be designed as desired or based on the surface topography of the structure upon which the transmission node is to be mounted. In an exemplary embodiment, the back portion of the chassis may include a concave center portion and flat outward extending areas as for example shown in FIGS. 6 and 10(*a*)-10(*c*). Such design has the advantage of being adaptable to mounting on a pole like structure, or a flat structure such as a wall. The back portion of the chassis may also be designed to engage a variety of different brackets. Such adaptable design may include, for example, a variety of screws or studs at different locations. Such design may allow the ability to easily mount the transmission node on surfaces of different topography by simply replacing the types of brackets. As discussed above, the brackets may also be designed based on the structure upon which the transmission node is to be mounted. The brackets may include clamps held together with screws as for example, illustrated in FIGS. 1 and 10(*a*)-(*c*).

A potential consideration for the design of the chassis is heat dissipation. In exemplary embodiments, the chassis may be designed to have a shape that promotes heat dissipation so as to help prevent over heating of the transmission node.

The material of the chassis is also not limited. In an exemplary embodiment, the chassis may be formed of polyvinyl chloride (PVC). In other exemplary embodiments, the chassis may be made of a plastic material. In exemplary embodiments, the material used for the chassis and/or the internal components of the transmission node may also have the ability to dissipate heat. Some materials that may be used to provide efficient heat dissipation may include metals such as aluminum, copper and steel.

Additional heat dissipation or other temperature controlling features may also be added to the transmission nodes. For example, each node may be equipped with one or more heat sinks, mechanical fans, heating or cooling pipes, or other like designs that is able to either dissipate or provide heat to the transmission nodes. Operation of any such heat controlling devices may be performed by a separate controller, or integration of such control in the PoE switch. Alternatively, such operation may also be managed remotely.

The chassis may also be designed to withstand various weather conditions. In an exemplary embodiment, the transmission nodes may be able to withstand wind loading of 115 mph. The transmission nodes may also be designed to operate at temperature ranging from −40° C. to 65° C. The transmission nodes may also be designed to have an Environmental IP rating of IP65. In an exemplary embodiment the external ports, such as the PoE and SFP ports may have an Environmental IP rating of IP67. These properties of the transmission nodes may be modified as desired depending on the intended use and location of the devices. Thus, the transmission nodes may be designed to have varied wind loadings, Environmental IP ratings, and operable temperatures. In an exemplary embodiment a transmission node may weigh about 30 pounds and have a max height of 40 inches. Although size and weight may be modified as desired. An advantage of the small weight and size is the ability to install transmission nodes on smaller structures and thus providing more options for transmission sites. For example, the small size and weight provides the ability to mount the transmission nodes on street light poles.

In exemplary embodiments, transmission nodes may also be designed to withstand lightning. For example, the transmission nodes may be equipped with a ground lug, for example an AWG #6 ground lug. Also, lightning protection capabilities may be implemented with the following characteristics. Impulse spark-over voltage at 100 V/µs, may have a 99% measured values of <550 V for the Ethernet port (uplink and downlink) and AC Power<950 V. This is in comparison with typical values of <450 V and <800 V respectively. Also, the Impulse spark-over voltage at 1 KV/µs, may have a 99% measured values<700 V for the Ethernet port (uplink and downlink), and <1050 V for the AC Power. This is in comparison with typical values of <600 V and <900 V respectively. Also, the nominal impulse discharge current (wave 8/20 µs) may be 5 KA for the Ethernet Port (uplink and downlink) and 2.5 KA for the AC Power. The single impulse discharge current (wave 8/20 µs) may be 5 KA for the AC Power. The transverse delay time may be <0.2 µs for the Ethernet Port (uplink and downlink). Finally, the DC spark-over voltage may be 90V±20% for the Ethernet Port (uplink and downlink) and 500V±20% for the AC Power.

Transmission nodes from different transmission sites within a given local area network system may be interconnected in different ways. In one exemplary embodiment, the nodes may be interconnected via fiber optics. For example, by using a GPON. As discussed above, access to a GPON may be accomplished, for example, through the use of an SFP port. Alternatively, network connections may be accomplished using PoE ports. In yet another alternative embodiment, the interconnection between the transmission nodes and connection to the network may be accomplished through the use of one or more backhaul devices 300 ("backhauls") as shown in FIG. 7.

One or more backhauls 300 may be connected to each transmission node 100 through the PoE port. In exemplary embodiments, the backhaul may also be integrated in the transmission node. In alternative embodiments, a backhaul may be a separate device from the transmission node, yet connected to the transmission node via PoE connection.

The backhaul may also be designed to self-align or to be adjustable along a given track. In an embodiment, the backhaul is powered by the transmission node through a PoE connection.

Figure 7:
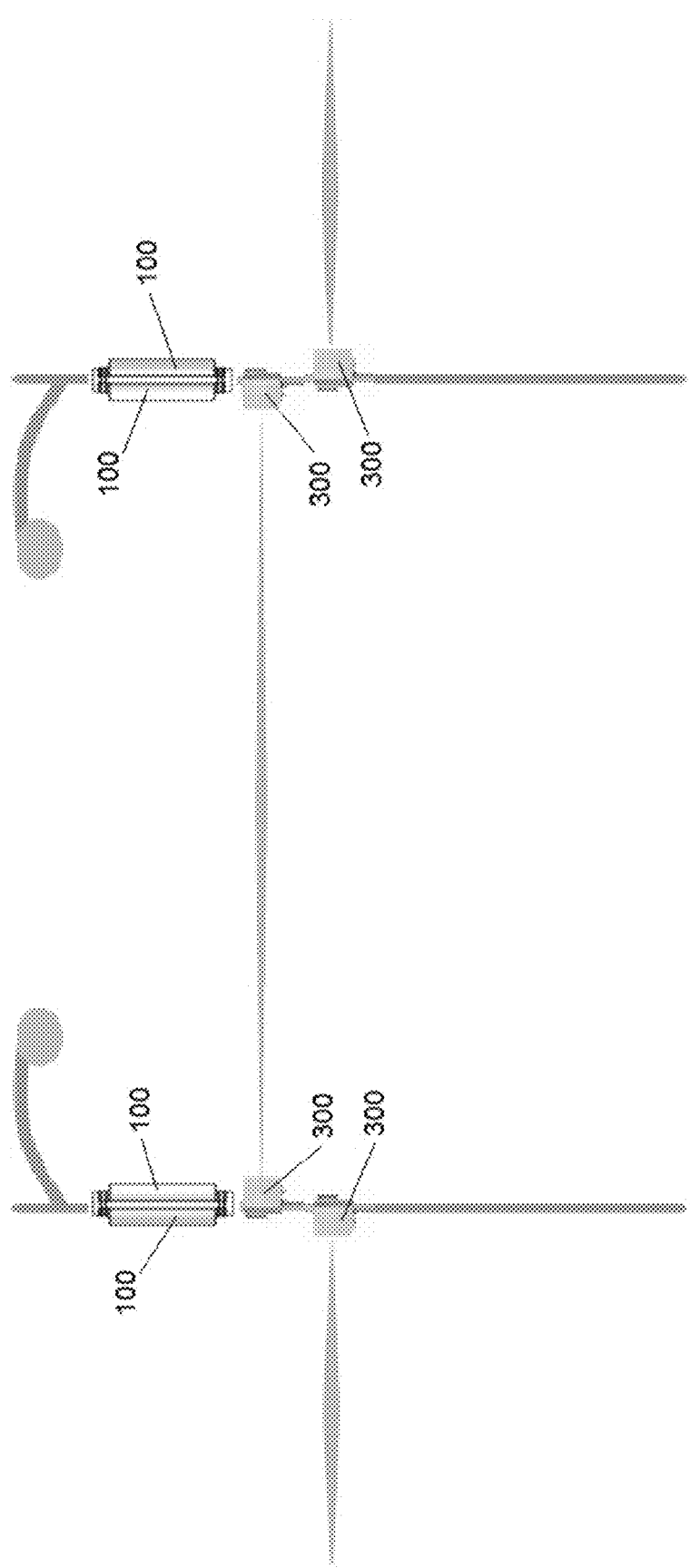
FIG. 7 is a diagrammatic representation of an exemplary communication between two transmission sites.

As shown in FIG. 7, in an exemplary embodiment, backhauls 300 may be a device separate from yet connected through a PoE connection to one or more transmission nodes 100. The backhaul may provide a one Gigabit full duplex wireless link. In an embodiment, the backhaul may employ millimeter wave technology. Other wave technology may be employed as well. For example, in an embodiment, the backhaul may employ microwave technology.

In exemplary embodiments, backhauls 300 may operate at a frequency of 70 GHz and employ millimeter wave technology. In an alternative embodiment, backhauls 300 may provide an all outdoor solution, with transmission capability of 57 GHz to 64 GHz, and 1 GB/s aggregate and a range of 1200 feet also employing millimeter wave technology. In an exemplary embodiment, backhauls 300 may operate at a frequency of 60 GHz in millimeter wave technology. Backhauls 300 may also have vertical or horizontal polarization. In an exemplary embodiment, a backhaul 300 may have a horizontal polarization. In an another embodiment, a backhaul 300 may have a vertical polarization. With respect to performance, in an exemplary embodiment, backhauls 300 may have a gain of 32 dBi, an azimuth beam width (AZ) of 3° and an elevation beam width (EL) of 7°. The beam width may further be adjusted based on the circumstances. Thus, the beam widths (AZ) and (EL) provided above are exemplary.

The backhaul may have different designs and sizes. In an exemplary embodiment, the backhaul may have a ring design. Other designs such as squares, rectangles, or other shapes may also be employed. The size of a backhaul is also not limited. In an exemplary embodiment, the backhaul may have a ring design one foot in diameter. In an alternative design, the backhaul may have a ring design two feet in diameter. In yet another exemplary embodiment, the backhaul may have a ring design 5.5 inches in diameter. In yet another exemplary embodiment, the backhaul may have a quadrilateral design with a width of 5.5 inches. In an embodiment the backhaul may have a square design 5.5 inches per side. The size of the backhaul may affect the range of transmission distance. For example, a one foot diameter ring may transmit up to half a mile range, whereas a two foot diameter ring may transmit up to a one mile range. In an exemplary embodiment wherein the width or diameter of the backhaul is 5.5 inches, the transmission range may be 1200 feet.

The backhaul may operate on a licensed or unlicensed spectrum. In an exemplary embodiment, the backhaul may be a low power consumption device. Connection between the transmission node and the backhaul may be achieved using a category 6 Ethernet cable. Also, in an embodiment the backhaul may implement an Advanced Encryption Standard (AES) that includes 128 bit security or a 256 bit security encryption.

Backhauls 300 may network in different manners. In one exemplary embodiment, backhauls 300 may network in a point-to-point (P-to-P) manner. In an exemplary embodiment, backhauls 300 may network to form a ring. In an exemplary embodiment, backhauls 300 may network in a point-to-multipoint (P-to-MP) manner to create a mesh network.

In exemplary embodiments, backhauls 300 may require low power consumption, and have multiple channels. In an exemplary embodiment, backhauls 300 may have 9 channels. Backhauls 300 may also be designed to have a low latency.

Backhauls 300 may further include DC power input. Backhauls 300 may include a ground. Backhauls 300 may also include multiple data interfaces. In an exemplary embodiment, backhauls 300 may include three 10/100/1000 Base-T RJ45 data interfaces. Backhauls 300 may also include an alignment interface.

In an exemplary embodiment, the backhaul is designed for high data transmission over a short distance. For example, the backhaul may be designed to transmit high data transmission speed, upward of one Gigabit. In an exemplary embodiment, the use of GPON may be implemented to increasing the backhaul data transfer speed to 2.5 Gigabit. In future generations, it is expected that the data transfer speed may be increased at least to 10 Gigabits. In exemplary embodiments, switch 141 may have upgradeable software or be replaceable to accommodate the increased data transfer speed. The ability to upgrade the software of switch 141 or to easily replace switch 141 may allow to scale the local area network system to handle the desired network requirements that may be imposed by newly developed technology or increased demand of data transfer speed.

In an exemplary embodiment the backhaul may be able to transmit over a distance between 100 and 400 yards. In another exemplary embodiment, the backhaul may be able to transmit over a distance of 200 yards. In yet another alternative embodiment, the backhaul may be able to transmit over a distance of 300 yards. In yet alternative embodiments, the backhaul may be able to transmit over a distance of 50 yards, 75 yards, 125 yards, 150 yards, 175 yards, 225 yards, 250 yards, or 275 yards, 325 yards, 350 yards, 375 yards, 400 yards, 425 yards, 450 yards, 475 yards, or 500 yards. Transmission over other distances are also within the scope of the invention.

Backhaul 300 may also be designed so as to withstand normal operating conditions. For example, if the backhaul is mounted on a pole, in exemplary embodiments the backhaul may be designed to properly operate and maintain transmission coping with any pole vibration and/or pole sway.

In an exemplary embodiment, backhauls 300 may be a Siklu EH600T Gigabit small cell backhaul.

In the event a backhaul were to malfunction, the affected transmission nodes may be designed to rely on one or more of the RF modules to maintain communication with the other transmission nodes. In one embodiment the transmission nodes may create a point-to-point (P-to-P) network. In an alternative embodiment, the transmission nodes may operate as a point-to-multi-point (P-to-MP) network. In an exemplary embodiment, the transmission nodes may operate to create a mesh network using the RF modules to maintain network connection with the other transmission nodes until operation to the malfunctioning backhaul is restored.

Figure 8:
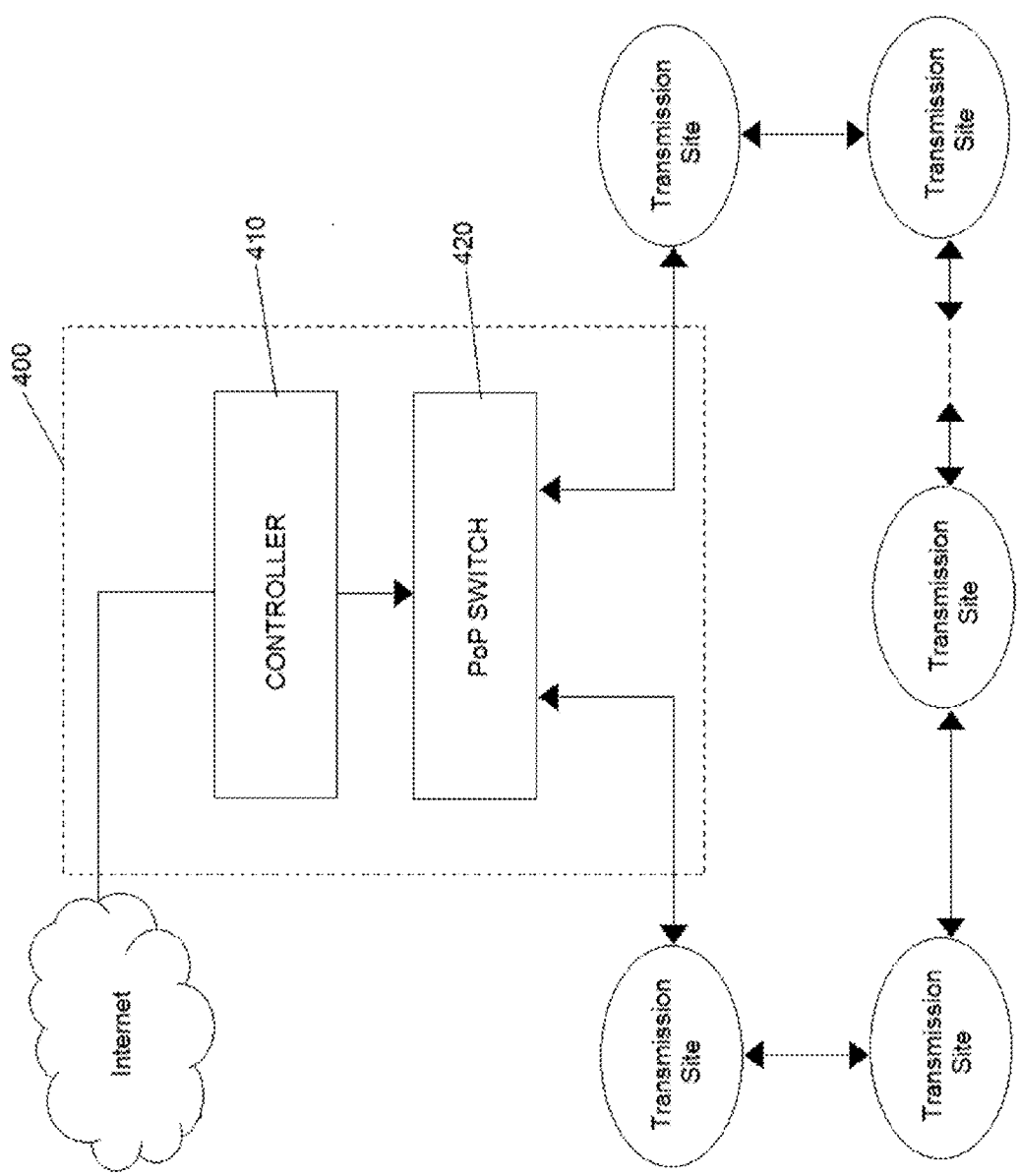
FIG. 8 is a diagrammatic representation of an exemplary system including a point of presence.

In an exemplary embodiment, a local area network may be created using a set of interconnected transmission nodes. An exemplary embodiment of such local area network system is provided in FIG. 8. As shown, the system includes at least one Point of Presence (PoP) 400 where may be provided a network interface controller ("controller") 410 and a switch ("PoP switch") 420.

For purposes of this description, a PoP is a physical location where a controller and a PoP switch may be housed. The location is not limited. In an exemplary embodiment, the PoP may be a building. In an alternative embodiment, the PoP may be its own stand-alone structure. In yet another alternative embodiment, the PoP may be underground.

There is no limitation as to the type of controller that may be used. The controller may be powered by an A/C power supply. In an exemplary embodiment, the controller may be an Access Controller AC 6006 by WyTec. In alternative embodiments, the controller may be AC7000, AC9000, or AC1000, all manufactured by WyTec. However, other controllers may also be used.

The controller may be able to manage a large number of access points and support a large number of users. In an exemplary embodiment, the controller may be able to manage 512 access points. In alternative embodiments, the controller may be able to manage 2000 access points. In yet an alternative embodiment, the controller may be able to manage 4000 access points. In another embodiment, the controller may be able to manage 12,200 access points. Also, a controller may be able to support anywhere between 32,000 and 768,000 users. In one embodiment, the controller may be able support 120,000 users. In another embodiment, the controller may be able to support 200,000 users. The number of access points and users the controller may manage and support should not be viewed as limiting and various designs may be used for the intended purposes.

In an exemplary embodiment, the controller's carrier grade may be 99.9999% availability and 17 years mean time between failures (MTBF). The controller may also be highly scalable. The controller may have a modular chassis. The controller may also provide 3G/4G offload authentication operations. For example, in one embodiment the controller may provide EAP-SIM. In an embodiment, the controller may provide EAP-AKA. In yet another embodiment, the controller may provide Hotspot 2.0.

The controller may also have different ports. For example, the controller may have between 6 and 288 one-Gigabit ports. In an exemplary embodiment, the controller may have 32 one-Gigabit ports. In another alternative embodiment, the controller may have 96 one-Gigabit ports. In exemplary embodiment, the controller may also have one or more ten-Gigabit ports. For example, the controller may have 6 ten-Gigabit ports. In an alternative embodiment, the controller may have 12 ten-Gigabit ports. In yet another embodiment, the controller may have 36 ten-Gigabit ports.

In an embodiment, controller 410 may connect to the internet via different servers and different service providers or carriers. In one embodiment, controller 410 may be connected to a single service provider or carrier. In an alternative embodiment, controller 410 may be connected to multiple service providers or carrier. In yet alternative embodiments, controller 410 is able to connect to the network independent of any service provider or carrier. In this manner, the system may be able to provide network coverage for any carrier. In one embodiment the system is able to provide network coverage for multiple carriers at the same time.

In an exemplary embodiment, in addition to being connected to the internet, controller 410 may be connected to PoP switch 420. PoP switch 420 may then be in communication with one or more transmission nodes either through a GPON connection, fiber optics, or through the use of backhauls. PoP switch 420 is not particularly limited.

In an exemplary embodiment, PoP switch 420 may be a CISCO Catalyst 3750-X or a 3560-X series. The PoP switch may be a standalone switch or a stackable switch. In an exemplary embodiment, the PoP switch is able to provide high availability, scalability, security, energy efficiency, and ease of operation. The PoP switch may also include additional features such as increased PoE configurations, optional network modules, redundant power supplies, and media access control security (MACsec) features.

In an embodiment, PoP switch 420 may enable applications such as IP telephony, wireless, and video for borderless network experience. The PoP switch may also have features such as multiple uplink network modules Gigabit Ethernet ports. The PoP switch may also provide flexible netflow and switch-to-switch hardware encryption with a service module uplink.

In an embodiment, PoP switch 420 may provide open shortest path first (OSPF) for routed access in IP Base image. The PoP switch may also include one or more USB ports. The USB ports may be Type A or Type B. The PoP switch may also be configured as desired. In an exemplary embodiment, the PoP switch may be configured with four optional network modules. Also, PoP switch 420 may be capable of switching between PoE and SFP with either IP Base or IP Services feature set.

In an embodiment the combination of the controller 410, PoP switch 420 and a series of transmission nodes may be used to create a local area network. In an exemplary embodiment, backhauls may also in conjunction with the controller, PoP switch and transmission nodes to create a local area network. An illustrative embodiment is provided in FIG. 9. A PoP 400 may be a building 500. From there, controller 410 can connect to the internet and PoP switch 420 can communicate with a series of transmission nodes.

Figure 9:
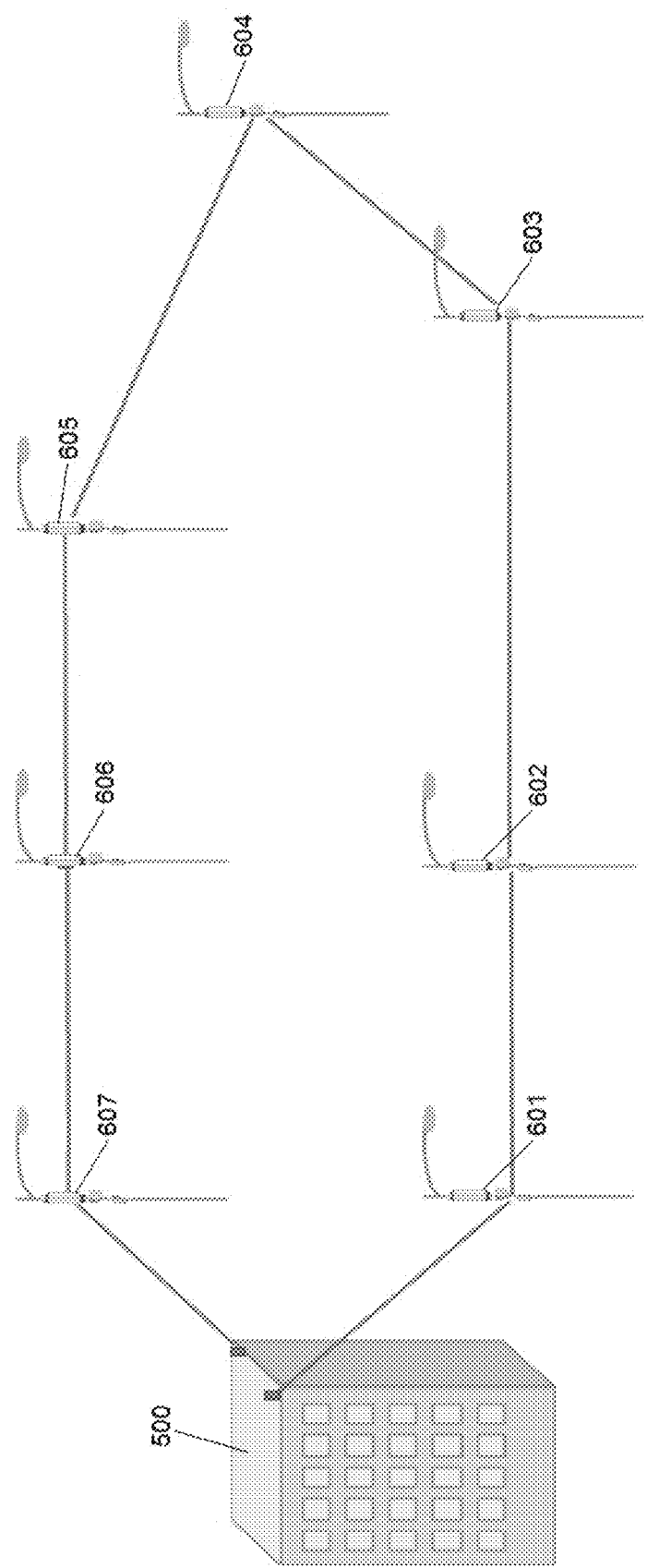
FIG. 9 is a diagrammatic representation of an exemplary system creating a local area network by arranging a set of transmission sites to form a loop.

In one embodiment, the system may include transmission sites 601 to 607. As illustrated in FIG. 9, each transmission site may be located at a street light pole. In an exemplary embodiment, each transmission site may include one or more transmission nodes. In an embodiment, each transmission site may also include one or more backhauls. In exemplary embodiments, a transmission site does not require any additional equipment for basic network operation other than one or more transmission nodes. In alternative embodiments, each transmission site does not require any additional equipment for basic network operation other than one or more transmission nodes and one or more backhauls. For example, each transmission site may include two transmission nodes arranged at 180° and two backhauls arranged so that they can be in communication with backhauls of the two closest other transmission sites. In the illustrated exemplary embodiment shown in FIG. 9, the transmission sites may be in communication so as to create a loop that starts at 601 and ends at 607. The PoP switch located in building 500 may then be in direct communication with transmission sites 601 and 607. The PoP switch may be placed into communication with the transmission sites using backhauls or by using fiber optics, GPON or like connection.

In the illustrated exemplary embodiment of FIG. 9, each transmission site may provide a small cell network with a 360° range In this manner, the loop of transmission sites 601 to 607 can create a local area network.

As a network user travels along the covered area, the user may be provided with network access with access signals being handed off from one transmission site to the next. In an exemplary embodiment, the system may be designed in a way such that a the user moves away from one transmission site and closer to the next transmission site, the handoff is executed once the signal from the next transmission site has been detected.

In an exemplary embodiment illustrated in FIG. 9, the transmission sites create a loop. This arrangement is not limiting and the transmission sites may be arranged in any number of ways as may be desired. For example, the transmission sites may be arranged in a line, a wheel and spoke arrangement, at random or at any other desired arrangement. A loop arrangement, however, may provide an advantage in the event one of the transmission nodes malfunctions. In such scenarios, the remaining transmission nodes are still able to communicate with the controller located in the PoP. Another possible advantage of a loop arrangement is that it is able to provide twice the bandwidth by transmitting in both directions of the loop.

In an exemplary embodiment, the system may also be provided with a local memory storage device. Any device that is able to store data may be employed. In exemplary embodiments, a memory storage device may include random access memory ("RAM") device, hard drives, optical memory devices like compact disks and DVDs, flash memory (e.g. USB flash drives or keys), floppy disks, magnetic tape, paper tape, punched cards, standalone RAM disks, and Iomega Zip drives. These storage devices may further include a processor for recording, deleting, and accessing the information. The local memory storage device may be connected to the controller.

In an exemplary embodiment, the system may include one or more cameras or other device such as video, audio or other type of sensor, communication or control device, at one or more transmission sites connected to the respective transmission nodes. Any information, for example video or sound, captured by the one or more cameras may be recorded and stored in the local memory storage device. The captured information may also be uploaded into a cloud storage device. The captured information may also be transmitted outside the system through the internet. Likewise, video, sound or other information stored either in local memory, on the cloud or other location may be transmitted to any device located at the one or more transmission sites.

In an exemplary embodiment, the memory storage device may include information that may be useful during system operations. There is no limitation as to how information provided in a local memory storage device may be used through access by the system. Also, there is no limitation as to storing on a cloud information gathered from the system or to be accessed by the system.

In an exemplary embodiment, the local area network may be expanded in different ways. In one embodiment, the local area network may be expanded by adding transmission sites. The number of transmission sites provided in FIG. 9 is only exemplary and may be adjusted as desired. Given the configuration of the transmission nodes and backhauls described previously, the addition of more transmission sights can be easily and cost effectively accomplished. In an exemplary embodiment, the system may include 25 transmission sites. Each transmission site may include one or more transmission nodes. Each transmission site may also include one or more backhauls.

In an alternative embodiment, the network may be expanded using GPON connections. GPON networking may be used in place of backhauls. In an alternative embodiment, GPON connections may be used in combination with the use of backhauls. In an exemplary embodiment, all transmission sites may be interconnected using GPON. In such exemplary embodiment, fewer controllers may be used for larger area networks because little to no signal deterioration occurs over long distances when using GPON connections and thus the number of transmission sites may be limited only by the controller capabilities. In exemplary embodiments, other connections, fiber optics or otherwise, that can provide high data transmissions may be used in place of GPON connections to achieve expanded system operations as described herein as or similar to those achieved by using GPON connections.

In an alternative embodiment, the network may be expanded by the combination of multiple smaller network systems. For example, two or more PoPs, each managing its own set of access points through a series of transmission sites, may be connected to communicate with each other. One PoP may be designated as the primary PoP and control the other PoPs connected thereto. The connection between PoPs may be accomplished in various manners. In one exemplary embodiment, two or more PoPs may be connected via a GPON or other fiber optics or Ethernet connection. Alternative connections may also be employed. In an exemplary embodiment the connections may be made using one or more backhauls.

In yet another embodiment, PoP may be a non-physical location. In an exemplary embodiment, the controller may be implemented on a cloud. In such an embodiment, each transmission node may be equipped with a software upgradable switch that can be upgraded to interact with the cloud controller. In such exemplary embodiment, the PoP switch would not be necessary. Thus, no physical fixed location would exist for a PoP. In an exemplary embodiment, using a could controller, various area networks may be controlled without use of physical or interconnected PoPs.

In exemplary embodiments, the system described herein may maintain short distance transmission between transmission sites. An advantage of an exemplary embodiment of the system described herein is the ability to maintain higher data throughput when compared to existing pico and micro cell types networks. In exemplary embodiments, the system may provide data throughput of one Gigabit. In exemplary embodiments, the system may be connected using GPON and provide data throughput of even 2.5 Gigabits. In contrast, existing micro and pico cell networks can only provide an aggregate throughput ranging between 20 and 150 Mbps using any one of cable, fiber optic, GPON, microwave transmission, or combination thereof. Even cell types at the macro level cannot provide the same throughput as may be achieved in exemplary embodiments of the system described herein. Typical macro level cells can provide a throughput in the range of 50 to 300 Mbps either with fiber optics or microwave technology.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A transmission node having a modular structure comprising:
    a chassis including at least a front portion and a back portion, forming an enclosure;
    a plurality of sectors defined within the enclosure, wherein the plurality of sectors each extend lengthwise with respect to the enclosure;
    a plurality of card slots in each of the plurality of sectors, each card slot capable of hosting an RF module, wherein the plurality of card slots are arranged in rows, across the plurality of sectors, along the length of the enclosure;
    at least one RF module in at least a first one of the plurality of card slots;
    a switch module in at least a second one of the plurality of card slots;
    PoE connectors between the switch and the plurality of card slots; and
    a power source module in at least a third one of the plurality of card slots.

2. The transmission node of claim 1, wherein the RF module is a 2.4 GHz 802.11n and 5 GHz 802.11ac combined RF module.

3. The transmission node of claim 1, wherein the plurality of sectors comprises:
    a first sector and a second sector; and
    eight card slots, four card slots in each of the first and second sectors.

4. The transmission node of claim 3, further comprising:
at least two modules, the two modules being two RF modules of the same kind.

5. The transmission node of claim 4, wherein one of the two RF modules is provided in a card slot located in the first sector and the other RF module is provided in a card slot located in the second sector.

6. The transmission node of claim 5, wherein the two RF modules are located in card slots located in different rows.

7. The transmission node of claim 1, wherein a module hosted in the plurality of card slots may be replaced.

8. The transmission node of claim 1, wherein the chassis is capable of dissipating heat.

9. The transmission node of claim 1, wherein the chassis is designed to be mounted on a pole such that a shape of the chassis matches the contour of the pole.

10. The transmission node of claim 1, wherein the plurality of card slots may be tilted 0° to 10°.

11. The transmission node of claim 1, further comprising:
at least one external PoE port, and
at least one external SFP port.

12. The transmission node of claim 1, wherein the plurality of sectors are arranged in parallel relative each other.

13. The transmission node of claim 1, wherein the modules lie flat in the slots.

14. The transmission node of claim 1, wherein the plurality of sectors are oriented at (180/(number of sectors))° relative each other.

15. The transmission node of claim 1, wherein a cross-section of the chassis is arc-shaped.

16. A transmission site comprising:
at least one modular transmission node as described in claim 1; and
at least one backhaul.

17. The transmission site of claim 16, further comprising: a camera, wherein the camera is connected to the transmission node.

18. The transmission site of claim 16,
wherein the backhaul is separate from the transmission node; and
wherein a PoE connects the backhaul to the transmission node.

19. A local area network system comprising:
a controller connected to the internet;
a switch connected to the controller; and
a plurality of transmission sites, each transmission site comprising at least one modular transmission node as described in claim 1.

20. The local area network system of claim 19, further comprising one or more backhauls connected to the controller of at least one modular transmission node at each of the transmission sites.

21. The local area network system of claim 20, wherein the plurality of transmission sites are arranged in a loop.

22. The local area network system of claim 19, further comprising: a local area memory device, the memory device connected to the controller.

23. The local area network system of claim 19, further comprising: a camera at one or more of a plurality of transmission sites, wherein the camera is connected to the at least one modular transmission node located at the same transmission site as the camera.

24. The local area network of claim 19, wherein the at least one modular transmission node at each transmission site is mounted on a pole.

25. The local area network of claim 19, further comprising: at least two cascaded modular transmission nodes at each transmission site.

* * * * *